United States Patent
Huff et al.

(10) Patent No.: US 7,044,158 B1
(45) Date of Patent: May 16, 2006

(54) CONTINUOUS FILTRATION SYSTEMS USING PUMP, VENTURI AND FLOW CONTROL VALVE

(76) Inventors: Karl C. Huff, 1214 W. Glenlake Ave., Chicago, IL (US) 60660-2504; Allan S. Chace, 861 Middlebury Dr., Worthington, OH (US) 43085-3463

( * ) Notice: Subject to any disclaimer, the term of this patent is extended or adjusted under 35 U.S.C. 154(b) by 870 days.

(21) Appl. No.: 09/697,728

(22) Filed: Oct. 27, 2000

Related U.S. Application Data

(60) Division of application No. 09/085,370, filed on May 19, 1998, now Pat. No. 6,149,824, which is a continuation-in-part of application No. 09/036,122, filed on Mar. 6, 1998, now abandoned, which is a continuation-in-part of application No. 08/697,336, filed on Aug. 22, 1996, now Pat. No. 5,725,758.

(51) Int. Cl.
*F16K 37/00* (2006.01)
*B01D 61/36* (2006.01)

(52) U.S. Cl. .................. 137/552; 137/601.16; 210/779; 210/167; 210/195.2

(58) Field of Classification Search ............... 137/552, 137/597, 599.03, 601.16; 210/167, 194, 195.2, 210/779
See application file for complete search history.

(56) References Cited

U.S. PATENT DOCUMENTS

| | | | | |
|---|---|---|---|---|
| 3,856,676 A | * | 12/1974 | Grimme, Jr. et al. | 210/257.2 X |
| 4,026,800 A | * | 5/1977 | Friedrich et al. | 210/87 |
| 4,172,033 A | * | 10/1979 | Willock | 210/91 |
| 4,243,523 A | * | 1/1981 | Pelmulder | 210/194 X |
| 4,277,336 A | * | 7/1981 | Henschel, Jr. | 210/167 |
| 4,366,051 A | * | 12/1982 | Fischel | 210/134 X |
| 4,411,781 A | * | 10/1983 | Schnabel et al. | 210/416.1 X |
| 4,498,982 A | * | 2/1985 | Skinner | 210/416.1 X |
| 4,655,930 A | * | 4/1987 | Kuhn et al. | 210/167 X |
| 4,680,109 A | * | 7/1987 | Yamada et al. | 210/257.2 X |
| 5,075,002 A | * | 12/1991 | Thalmann et al. | 210/257.2 X |
| 5,395,514 A | * | 3/1995 | Siegler | 210/85 |
| 5,456,827 A | * | 10/1995 | Nikutta et al. | 210/167 |
| 5,503,735 A | * | 4/1996 | Vinas et al. | 210/134 |
| 5,725,758 A | * | 3/1998 | Chace et al. | 210/85 |

* cited by examiner

*Primary Examiner*—John Rivell

(57) ABSTRACT

Continuous filtration systems comprising a venturi, flow control valves, filter and pump. In one specific embodiment the flow control valve and venturi are combined hereinafter referred to as a CHUF. The CHUF may also contain concentrate release, and temperature, flow and two pressure sensors into a single structure. A continuous filtration system for liquid or gas applications is constructed by plumbing a CHUF to a pump and filter. The CHUF is constructed of plastic, stainless steel or other materials. Different plumbing to the CHUF positions the filter in either series, parallel, or series and parallel with a venturi and flow control valve resulting in different pressures and flows at the filter. A single flow control valve simultaneously controls inflow and outflow of the filtration system. Additional flow control valves are used in a process to control pressure independent of flow at the filter.

20 Claims, 7 Drawing Sheets

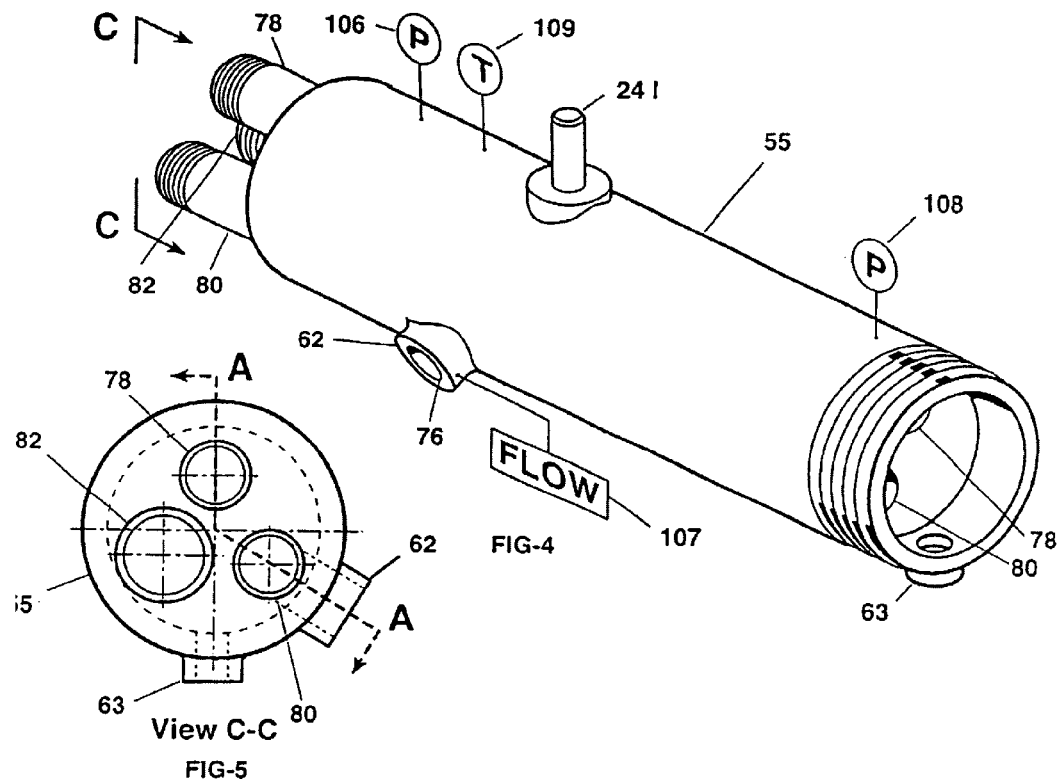
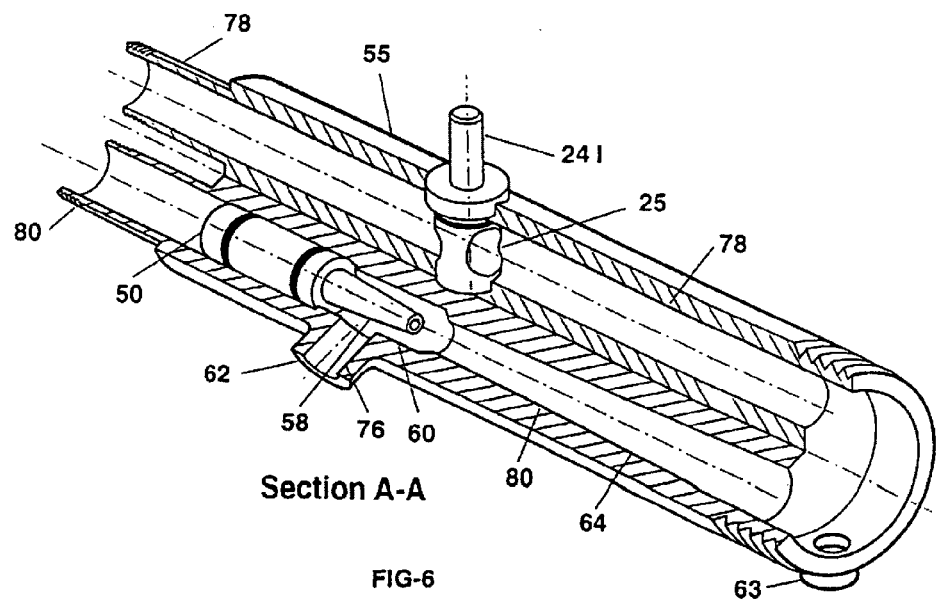

View D-D

Section B-B

Section B-B

CONTINUOUS FILTRATION SYSTEMS USING PUMP, VENTURI AND FLOW CONTROL VALVE

RELATED APPLICATIONS

This application is a divisional application of application Ser. No. 09/085,370, filed May 19, 1998, now U.S. Pat. No. 6,149,824, which is a continuation-in-part of application Ser. No. 09/036,122, filed Mar. 6, 1998 now abandoned which is a Continuation-in-part of application Ser. No. 08/697,336, filed Aug. 22, 1996, now U.S. Pat. No. 5,725,758, each of which are incorporated herein by reference in their entirety.

TECHNICAL FIELD

This invention relates to a valve comprising a concentrate release mechanism, venturi, flow control valves, and flow, pressure and temperature sensors (hereinafter referred to as a CHUF); the use of the CHUF in a filtration apparatus; and processes using the apparatus.

BACKGROUND OF THE INVENTION

Cross flow filtration systems separate a liquid or gas fluid mixture into two component fluids. There are multiple applications for cross flow filtration systems throughout most industries, including the purification of parts washing baths, removal of dyes from waste streams, concentration of sap for more efficient production of maple syrup, separation of fermentation products from a brew, and purification of salt water to produce fresh drinking water. This invention is specifically applicable to any liquid or gas fluids in microfiltration, ultrafiltration, nanofiltration, and reverse osmosis applications.

Filters are a porous mass through which a gas or liquid is passed to separate matter in suspension. Frequently membranes are attached to a filter media to establish a semipermeable barrier that selectively rejects some solutes while passing others. Membranes can also separate solute without the use of a filter substrate. In the following discussion the term filter includes a membrane-type filter. Filters are made of polymers, ceramic, stainless steel, and other materials including liquids.

Pressure and flow are used to deliver a fluid to the filter surface. Cross flow filters have a component of the total flow along the filter surface. Flow along the filter surface helps keep the filter clean. Flow along the surface of the filter can be recycled. In this invention and in U.S. Pat. No. 5,725,758 recycled flow, which may or may not pass through the filter, is used to suck feedstock into the recirculation loop.

That portion of the fluid mixture which is forced through the filter is referred to as permeate. The permeate is a purified fluid mixture. The remaining portion of the fluid in the filtration system which does not pass through the filter is referred to as retentate. The retentate is the residual fluid mixture. The retentate contains molecules and particles too large to pass through the filter. Once removed from the filtration system, the retentate becomes known as concentrate. Feedstock, which is the fluid to be subject to filtration, is forced or, in this invention, sucked into the retentate to replace the permeate.

Batch filtration systems pump a feedstock under pressure to a cross flow filter. The permeate which flows through the filter is collected as permeate. The retentate that remains in the system downstream from the filter is expelled as concentrate after a single pass through the cross flow filter.

Continuous filtration systems use a feed pump to add under pressure a feedstock to the retentate. The retentate is continually recycled under pressure with a recirculation pump in a closed loop. Concentrate is removed from the filtration system after passing the cross flow filter several times (on average). When removed, the concentrate is at a desired concentration of the desired component. This invention primarily applies to continuous filtration using a single pump, although one example is presented and claimed for batch filtration.

The invention contemplated herein and referred to as a CHUF is frequently mentioned in the following text. The CHUF best fits the definition of valve. A valve is defined as any of numerous mechanical devices by which the flow of liquid or gas may be started, stopped, or regulated by a movable part that opens, shuts, or regulates one or more ports or passageways.

The CHUF is a rather enhanced valve since it combines into a single structure a venturi and a bypass flow control valve. In further embodiments the CHUF also comprises, two flow control valves, temperature sensor, pressure sensors, and a flow sensor. The CHUF is made of plastic, stainless steel, or other material. It greatly simplifies the construction and control of continuous filtration systems.

The CHUF contains a venturi which sucks feedstock into the filtration system. A venturi is a short tube that is inserted in a pipeline, that has flailed ends connected by a restricted middle, that depends for operation upon the fact that as the velocity of the flow of a fluid increases in the constricted part, the pressure decreases, and that is used for producing suction. Aspirators produce suction, and eductors extract. The term aspirators or eductors are equivalent to the term venturi if suction or extraction depends upon the flow of a fluid or pressure of a flowing fluid.

Most of the referenced patents refer to the sucking of a fluid into a system. Referenced U.S. Pat. No. 5,725,758 by Chace et al., U.S. Pat. No. 4,026,800 by Friedrick et al. and U.S. Pat. No. 5,395,514 by Siegler are most closely related to this invention. Fredrick's patent discloses combining a sucking means before a pump and bypassing part of the fluid to be entered to the orifice, by means of a valve, and directing the fluid not passed to the orifice to the pump. In Fredrick's patent the bypass connects to the suction side of the venturi. Unlike Fredrick's patent the bypass in this invention and in U.S. Pat. No. 5,725,758 is completely around the venturi. The bypass described in Fredrick's patent is different from that in this invention as they serve different purposes.

Siegler discloses a membrane filtration apparatus that uses a sucking device and flow control valve. Siegler removes concentrate from the filtration system through a diverter. This concentrate is then mixed in a container with the existing feedstock and sucked back into the filtration system through the suction side of a venturi (eductor). In this invention the bypass is again completely around the venturi. Also, in this invention concentrate is removed only when it is totally concentrated, and never recycled back through the system as a component of feedstock as does Siegler's invention.

The inventions by Seigler, Fredrick, and Chace all use a control valve to control sucking of a feedstock fluid into a system. However, what must be evaluated is the effect of the control valve on the entire, closed loop system—not just on the control of suction. In addition to sucking fluid into the filtration system, the control valve in this invention and the control valve in the patent by Chace also control pressure within a closed loop. Pressure at the filter determines the rate of permeate production (flux). Therefore, in this invention a single control valve simultaneously controls inflow of feedstock into the filtration system through the venturi, which is flow dependent, and outflow through the filter, which is pressure dependent. No other referenced patent achieves this goal.

SUMMARY OF INVENTION

In its most general sense the valve of this invention comprises a venturi and flow controller which controls the fluid flow of feedstock and permeate. Optionally the inventive valve also comprises flow controller which controls the fluid flow of concentrate, and sensors for measuring fluid pressure, flow and temperature. There is also generally disclosed filtration system configurations; and processes to simultaneously control inflow and outflow of a filtration system with a single flow control valve.

Thus, there is disclosed a valve comprising a valve body: the valve body comprising:
 (a) feedstock conduit;
 (b) venturi flow conduit in contact at intersection with the feedstock conduit, and adapted to suck feedstock fluid through the feedstock conduit, the sucking force dependent upon flow through the venturi flow conduit;
 (c) a bypass flow conduit adapted to conduct bypass fluid through the valve; and
 (d) adjustable first flow controller to control flow of the bypass fluid.

The valve may also comprise:
 (e) a retentate release conduit adapted to conduct flow of retentate fluid from the valve body;
 (f) second flow controller to control the flow of the retentate fluid from the valve body;
 (g) inflow conduit downstream from the intersection;
 (h) a first pressure sensor to measure the pressure of the flow through the venturi flow conduit at a position upstream from the intersection;
 (i) a second pressure sensor downstream from the intersection;
 (j) a temperature sensor to measures temperature of the bypass fluid; and
 (k) a flow sensor to measure flow of the feedstock.

There is further disclosed a means to minimize pressure drop of the retentate when the flow of retentate is removed from the valve body through the flow control valve for retentate. The preferred means to minimize the pressure drop comprises a flow control valve, piston and spring within the retentate release conduit.

The invention also relates to a fluid filtering system adapted to separate a permeate from a feed stock fluid, the system comprising: (a) the inventive valve described above, (b) a pump and (c) a filter. In one embodiment the feedstock conduit within the inventive valve connects to the sump tank containing the feedstock; and the flow control valve for concentrate connects to the concentrate collection tank. The fluid filtering system may additionally comprise at least one retentate conduit circuit adapted to recirculate a flow of a retentate fluid through a single pump adapted with the inventive valve disclosed above and wherein at least one of (i) the bypass flow conduit of the valve, (ii) the venturi flow conduit of the valve or (iii) the inflow conduit of the valve is connected to the pump or to the filter. In yet another embodiment a first pressure sensor, a temperature sensor and flow sensor within the inventive valve are attached to a microprocessor. A fluid filtering system according to this invention uses a filter which is selected from reverse osmosis filters, nanofiltration filters, ultrafiltration filters and microfiltration filters. Preferably the filtering system according to this invention is a cross flow filter. A fluid filtering system according to this invention uses a pump comprising of a third pressure sensor to measure outflow pressure of the pump and a sensor to measure horsepower of the pump.

The present invention also relates to an apparatus for continuously separating feedstock fluid mixture into purified fluid mixture and residual fluid mixture, the apparatus assembled so that the residual fluid mixture is recirculated within two recirculating loops with common, single means to mix together and recirculate the residual fluid mixture within the recirculating loops, the first recirculating loop comprising:
 (a) means to separate and remove the purified fluid mixture from the residual fluid mixture, rate of separation dependent upon pressure of the residual fluid within the first recirculating loop comprising:
 (b) means to remove a portion of the residual fluid mixture from the first recirculating loop, the means to remove located downstream from the means to separate; the second recirculating loop comprising:
  (i) means to suck (pull) the feedstock fluid mixture into the separating means, so that the feedstock fluid mixture becomes mixed with part of the residual fluid mixture, the force of the means to suck controlled by flow of the residual fluid mixture within the second recirculating loop;
  (ii) means to bypass a portion of the residual fluid mixture around the means to suck, the bypass having means to control the flow of residual fluid mixture controlling sucking force, and control pressure of the residual fluid mixture within the first recirculating loop;
   wherein the rate of separation in the separation means is dependent upon the means to control pressure within the first recirculating loop. The means to suck is preferably a venturi and the means to control the pressure and flow of the residual fluid mixture is a control valve. The apparatus of the invention preferably uses a centrifugal pump as the means to recirculate, and a cross flow filter as a means to separate. In one embodiment the cross flow filter comprises filters selected from the group consisting of reverse osmosis filters, nanofiltration filters, ultrafiltration filters and microfiltration filters. In another embodiment all outflow from the filter of the residual fluid mixture is removed from the apparatus without recirculating within the apparatus (batch mode).

Another apparatus is described for continuously separating feed fluid mixture into purified fluid mixture and residual fluid mixture, the apparatus assembled so that the residual fluid mixture is recirculated within two recirculating loops with common, single means to mix together and recirculate the fluid residual mixture within the recirculating loops, the first recirculating loop comprising:
 (a) means to separate and remove the purified fluid mixture from the residual fluid mixture;
 (b) means to remove a portion of the residual fluid mixture from the first recirculating loop, the means to remove located downstream from the means to separate;
 (c) means to control pressure of the residual fluid in first recirculating loop which also control the flow of the residual fluid mixture in second recirculating loop, the means to control pressure and flow located downstream from the means to separate;

the second recirculating loop comprising:

(a) means to suck (pull) the feedstock fluid mixture into the separating means, so that the feedstock fluid mixture becomes mixed with part of the residual fluid mixture, the force of the means to suck controlled by flow of the residual fluid mixture within the second recirculating loop.

The means to suck is preferably a venturi and the means to control the pressure and flow of the residual fluid mixture is a control valve. The apparatus of the invention preferably uses a centrifugal pump as the means to recirculate, and a cross flow filter as a means to separate. In one embodiment the cross flow filter comprises a filter selected from the group consisting of reverse osmosis filters, nanofiltration filters, ultrafiltration filters and microfiltration filters.

There is also disclosed a process of using a valve in a process of filtering a fluid in a system comprising a filter, a venturi in fluid communication with inflow of fluid to be filtered, at least one fluid recirculation loop, the process comprising the steps of (a) positioning the control valve, the venturi, and the filter within the at least one fluid recirculation loop; and (b) operating the control valve to simultaneously regulate outflow from the filter and inflow into the at least one recirculation loops through the venturi. A preferred embodiment is that at least one fluid recirculation loop comprises two fluid recirculation loops in fluid communicative contact at one intersection with the control valve positioned in parallel with the venturi in the first fluid recirculation loop and the filter positioned in the second fluid recirculation loop. Another preferred embodiment is that at least one fluid recirculation loop comprises two fluid recirculation loops in fluid communicative contact at one intersection with the control valve positioned in series with the filter in the first fluid recirculation loop and the venturi positioned in the second fluid recirculation loop.

Another embodiment is a process of using four valves in a process of filtering a fluid in a system comprising a filter, three retentate closed loops in common fluid communicative contact at one intersection, a venturi in fluid communicative contact with inflow of fluid to be filtered, the process comprising the steps of positioning:

a) first control valve in series with the filter and in common fluid communication at one intersection;

b) second control valve in series with the filter, in common fluid communication at one intersection, and the venturi positioned in parallel with third flow control valve;

c) fourth control valve in series in the common fluid communication at one intersection, and the venturi positioned in parallel with the flow control valve; and, e) closing the first control valve, closing the fourth control valve, opening the second flow control valve and operating the third control valve to simultaneously regulate outflow from the cross flow filter and inflow to the two retentate closed recirculation loops through the venturi; and then, d) opening the first control valve, opening the fourth control valve, closing the second flow control valve and operating the third control valve to simultaneously regulate outflow from the cross flow filter and inflow to the two retentate closed recirculation loops through the venturi;

wherein the flow and pressure at the filter is switched to relatively higher pressure and lower flow at the filter thereby cleaning the membranes followed by production of high permeate through put. A preferred embodiment is to control pressure independent of flow at the filter by part partially or fully opening or closing all four control valves. As a preferred embodiment pressure at the filter is made independent at flow of filter by partially or fully opened the four valves.

Finally, a process of determining when to remove retentate from a filtration system is disclosed. The process consisting of:

(a) measuring the power use of a single pump within said filtration system comprising single pump, filter, venturi, valves; and (b) estimating the viscosity of the retentate knowing the power use by the single pump; and (c) estimating contamination of the retentate knowing the viscosity of the retentate.

BRIEF DESCRIPTION OF THE DRAWINGS

The nature and mode of operation of the present invention will now be more fully described in the following detailed description taken with the accompanying drawings within:

FIG. 4 is the exterior view of a CHUF;

FIG. 5 is the inflow end view of a CHUF showing view C—C;

FIG. 6 is a sectional view of a CHUF at A—A showing bypass and venturi;

Figure 1:
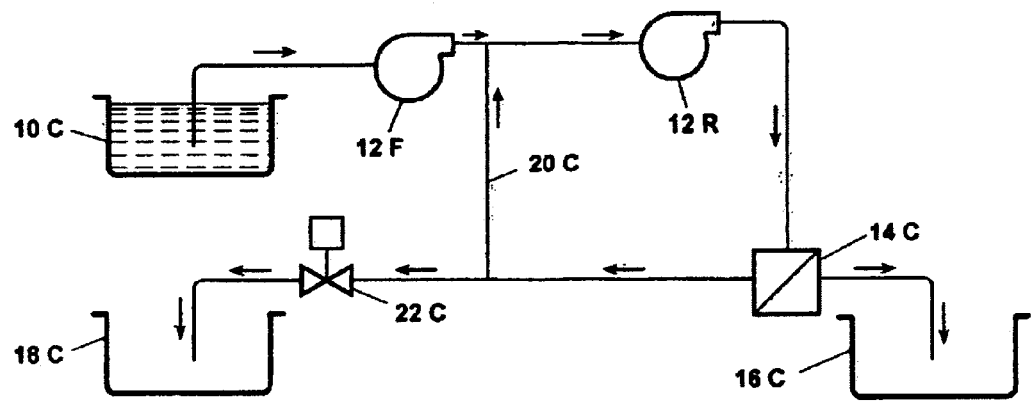
FIG. 1 is a flow diagram showing prior art continuous filtration.

REFERENCE NUMERALS IN DRAWINGS 10C sump tank
10I sump tank (for invention)
12F pump for feedstock
12R pump for recirculation
12I pump (for invention)
14C filter
14I filter (for invention)
16C permeate collection tank
16I permeate collection tank (for invention)
18C concentrate collection tank
18I concentrate collection tank (for invention)

20C closed loop
20I closed loop
22C flow control valve for concentrate
22I flow control valve for concentrate (for invention)
24I flow control valve for retentate (for invention)
25 hole in flow control valve
26I venturi (for invention)
50 nozzle
55 CHUF
58 tapered venturi flow channel
60 induction flow chamber
62 port for induction flow chamber
63 inflow conduit
64 expansion flow channel
76 feedstock conduit
78 bypass flow conduit
80 venturi flow conduit
82 retentate release conduit
84 piston
86 hole through piston
87 "O" rings
88 spring
90 port for concentrate
102 presser sensor 102
104 sensor to measure pump horsepower
106 pressure sensor 106
107 flow sensor 107
108 pressure sensor 108
109 temperature sensor 109

DESCRIPTION OF THE PREFERRED EMBODIMENT

FIG. 1 is a flow diagram for a typical continuous filtration system currently in use. As shown, feedstock is removed from a sump tank 10C by a pump for feedstock 12F. The pump for feedstock 12F pressurizes the feedstock so that it is forced to combine with and become part of the retentate. The retentate is continually recirculated in the closed loop 20C by a pump for recirculation 12R. After flowing through the filter 14C the permeate flows to a permeate collection tank 16C. Retentate is removed from the closed loop 20C through a flow control valve for concentrate 22C. A concentrate collection tank 18C collects the concentrate removed from the filtration system.

Figure 2:
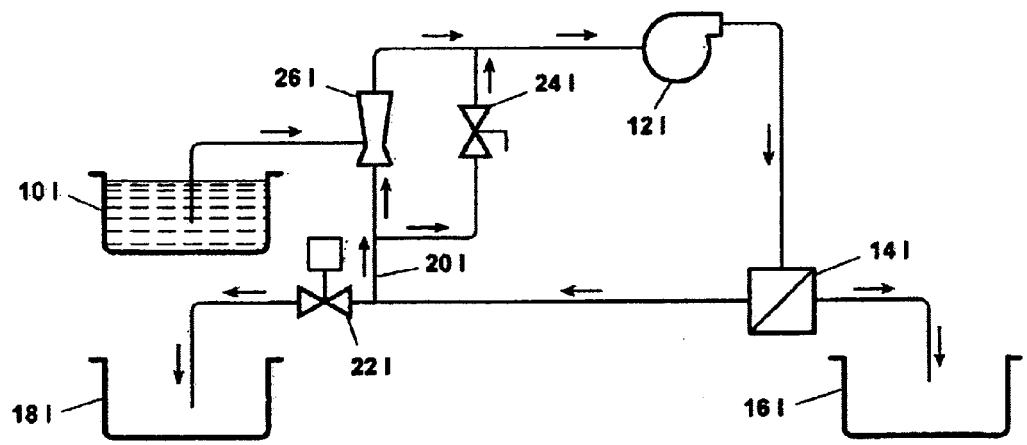
FIG. 2 is a flow diagram showing continuous filtration disclosed in U.S. Pat. No. 5,725,758.

U.S. Pat. No. 5,725,758 describes an invention for delivering and controlling the pressure and flow of the retentate at the surface of a cross flow filter. FIG. 2 shows that in this invention a single pump 12I circulates retentate around a closed loop 20I. Within this closed loop 20I the retentate flow is divided into two components. One component flows through the venturi 26I. The remaining bypass component flows through a manually operated flow control valve for retentate 24I. The flow through the venturi 26I is therefore controlled by a flow through the manually operated flow control valve for retentate 24I. The venturi 26I continually sucks (or pulls) feedstock from the sump tank 10I into the closed loop 20I. The pressure and flow at the filter 14I within the closed loop 20I is also controlled by opening or closing the manually operated flow control valve for retentate 24I to create a back pressure at the filter 14I. The concentration of the retentate is regulated by periodic blowdown of retentate by opening the flow control valve for concentrate 22I. The concentrate is removed to the concentrate collection tank 18I. The permeate that passes through the filter 14I is drained to the permeate collection tank 16I.

We discovered that there are a number of ways to combine, within recirculation loop(s), a pump 12I, venturi 26I, flow control valve for retentate 24I, flow control valve for concentrate 22I and a filter 14I to produce a filtration system where the inflow and outflow are simultaneously controlled by a single flow control valve. The first configuration we discovered is documented in U.S. Pat. No. 5,725,758. Additional system configurations and corresponding processes are claimed herein. We have also discovered that different external plumbing connections to a single CHUF 55 simplify the construction of all filtration system configurations. Different plumbing connections to the CHUF 55 produce different pressure and flow at the filter 14I.

Figure 3:
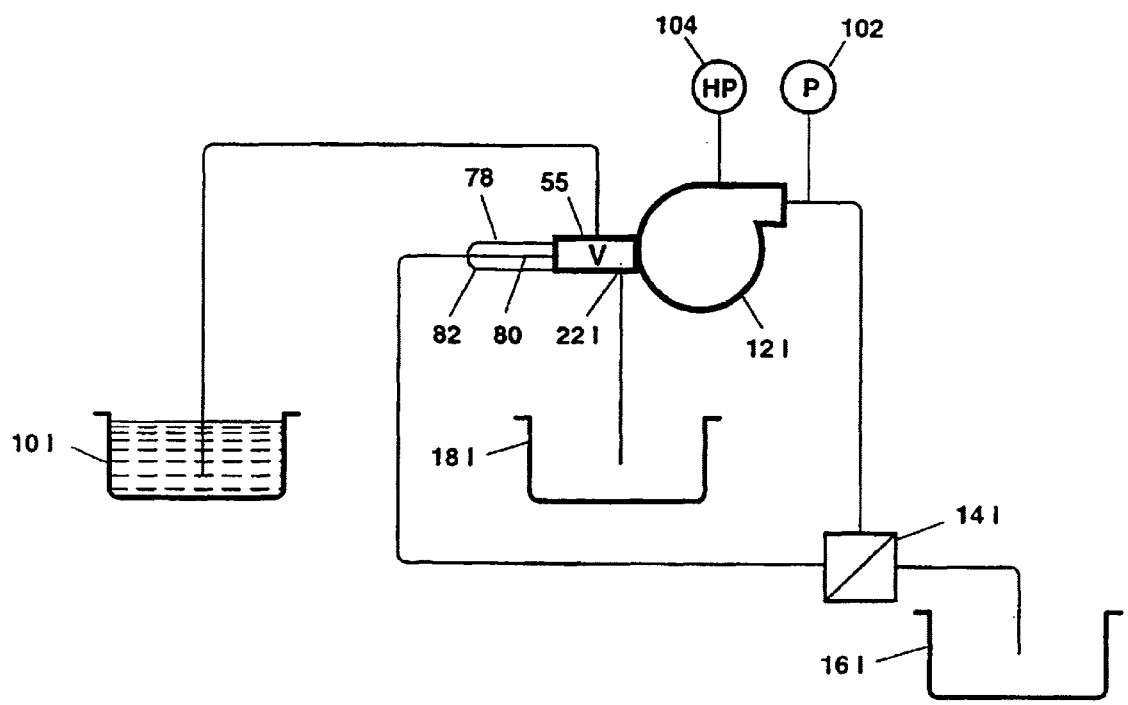
FIG. 3 is a flow diagram showing how a CHUF is used to construct the filtration system illustrated in FIG. 2.

FIG. 3 illustrates how a CHUF 55 is used to construct the filtration system illustrated in FIG. 2. Construction is reduced to plumbing. In this configuration the outflow of a CHUF 55 is attached to the inflow of a pump 12I. The pump 12I outflow is attached to the inflow of a cross flow filter 14I; and the outflow of the cross flow filter 14I is attached in parallel to the inflow of the CHUF's 55 bypass flow conduit 78, venturi flow conduit 80, and retentate release conduit 82. Conduit is connected to the CHUF 55 to suck feedstock from the sump tank 10I, remove concentrate to the concentration collection tank 18I through the flow control valve for concentrate 22I, and transport permeate from the filter 14I to the permeate collection tank 16I. Two sensors are added to the pump to provide inputs to computer algorithms that control the filtration system. First, pressure sensor 102 measures the outflow pressure of the pump 12I. A second sensor measures pump horsepower 104. Viscosity of the retentate can be estimated knowing the horsepower use of the single pump 12I. Viscosity of the retentate is a measure of how concentrated the retentate is. Therefore, changes in the horsepower used by the single pump 12I indicates when some of the retentate should be released as concentrate. A detailed description of this CHUF 55 follows.

FIG. 4 is an exterior view of the CHUF 55. It shows the inflow ends of two conduits that extend through the longitudinal axis of the CHUF 55. These conduits are the bypass flow conduit 78 and venturi flow conduit 80. These two conduits combine at the open outflow end of the CHUF 55 where the CHUF 55 connects to the pump inflow. After the flows from the two conduits are combined, an inflow conduit 63 is shown. The inflow end of the retentate release conduit 82 is shown at the inflow end of the CHUF 55. The feedstock conduit 76 is shown to contain a flow sensor 107.

FIG. 5 shows the end view of the CHUF 55 as viewed from position C—C. At the position shown in FIG. 5 the bypass flow conduit 78, venturi flow conduit 80, and concentrate release flow channel 82 extend through the capped end of the CHUF body. FIG. 6 is a sectional view of the CHUF 55 from position A—A as shown in FIG. 5. The inflow conduit 63 is shown in FIG. 5 and discussed later in this text. The inflow conduit 63 is plugged for the series configuration under discussion.

FIG. 6 shows that the bypass flow conduit 78 is a single straight conduit containing a flow control valve for retentate 24I. This valve 24I rotates thereby increasing or decreasing the flow that passes through the opening 25 in the flow control valve for retentate 24I. As shown in FIG. 4 pressure sensor 106 and 108 are added to the bypass flow conduit 78 to measure pressure before and after the flow control valve for retentate 24I. Temperature sensor 109 is also added to the bypass flow conduit 78. Alternatively, all sensors could be added to the venturi flow conduit 80 thereby measuring the pressure drop through the venturi 26I. FIG. 6 also shows flow that enters the induction flow channel 60 is measured by flow sensor 107. When the flow control valve for concentrate 22I, as shown in other FIGS. 8,9,11 and 13 is closed, then the permeate outflow is equal to the inflow measured by the flow sensor 107. Therefore flux can be directly measured by the flow sensor 107.

The venturi flow conduit 80 shown in FIG. 6 contains a removable nozzle 50. The nozzle 50 contains a tapered venturi flow channel 58 which serves to increase flow velocity of fluid as it moves through the nozzle 50. The fluid flow exits the nozzle 50 toward the end of the induction flow chamber 60. Feedstock, which may include steam, enters the induction flow chamber 60 through the port for induction flow chamber 62 which is connected to the feedstock conduit 76. The fluid flow through the nozzle 50 combines with the feedstock entering through the feedstock conduit 76 and continues to flow into the expansion flow channel 64 contained within the venturi flow conduit 80.

Figure 7:
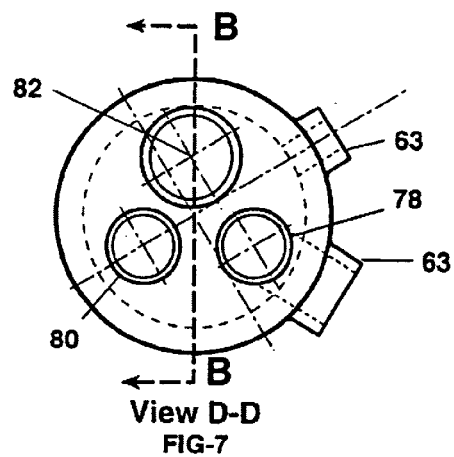
FIG. 7 is the inflow end view of a CHUF showing view D—D.
Figure 8:
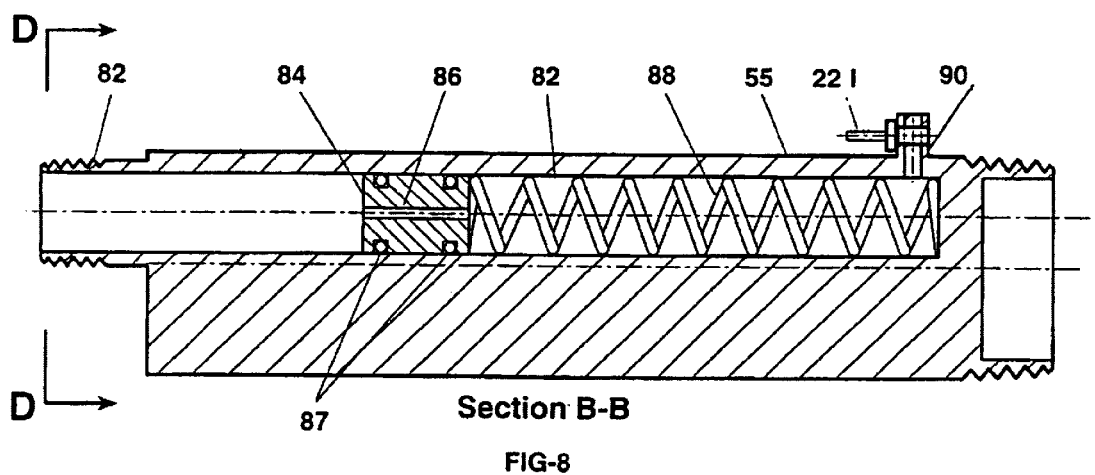
FIG. 8 is a sectional view of a CHUF at B—B showing spring and piston used in a concentrate release system.
Figure 9:
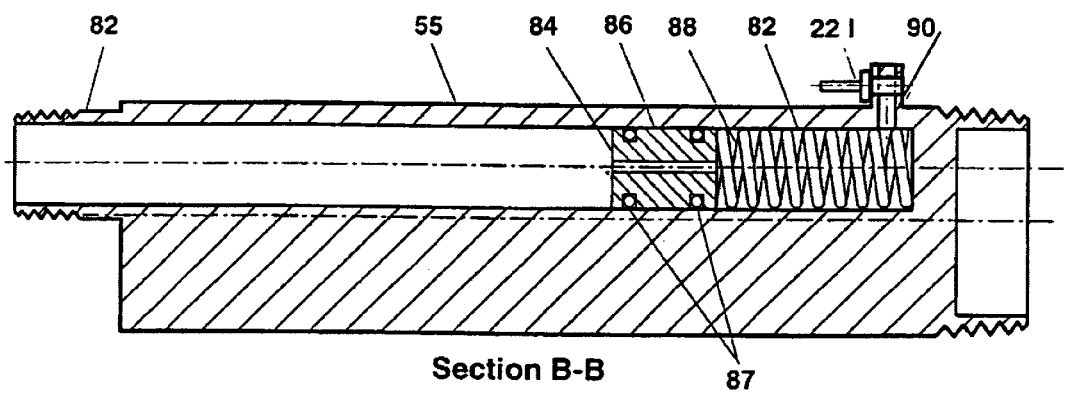
FIG. 9 is a sectional view of a CHUF at B—B showing spring in compressed position.

FIG. 7 is an end view of the CHUF 55. This view is identical to the view in FIG. 5 except that it shows cross section B—B. FIG. 8 and FIG. 9 illustrate a cross section of the retentate release conduit 82 along the B—B plane.

FIG. 8 shows a piston 84 with a hole through the piston 86 axis. Two "O" rings 87 prevent leaking around the piston 84. A spring 88 is shown between the piston 84 and dead end of the retentate release conduit 82. A port for concentrate 90 is at the dead end of the retentate release conduit 82. The port for concentrate 90 connects to the flow control valve for concentrate 22I. The port for concentrate 90 has a larger cross section than the cross section in the hole through the piston 86.

When the flow control valve for concentrate 22I is opened the pressure of the retentate pushes the piston 84 toward the dead end of the concentrate release flow channel 82 thereby compressing the spring 88. This process forces retentate trapped between the piston 84 and dead end of the retentate release conduit 82 to flow under pressure through the port for concentrate 90 to the concentrate collection tank 18I. FIG. 9 illustrates the position of the piston 84 and compressed spring 88 at this point during the concentrate release cycle. When the flow valve for concentrate release 22I is closed, the spring 88 pushes and returns the piston 84 to its original position as shown in FIG. 8. During the return, retentate flows through the hole through the piston 86 thereby filling the void between the piston 84 and dead end of the release flow channel 82.

We discovered though testing that most feedstocks do not produce a retentate that requires the use of the piston 84 or spring 88 in the retentate release conduit 82. However, feedstock that contained fibers occasionally plugged our flow control valve for concentrate 22I. We eliminated the plugging problem by releasing concentrate in a large volume under pressure using the piston 84 and spring 88 combination shown in FIG. 8 and FIG. 9. For retentate that did not contain fibers or other particles that plug small openings we released the concentrate from the filtration system without the piston 84 or spring 88 by simply opening the flow control valve for concentrate 24I to facilitate a small stream or drip. Another alternative for releasing concentrate is to periodically fully (or nearly fully) open and then close the flow control valve for concentrate 22I. However, the piston 84 and spring 88 configuration is the preferred method to release concentrate because it allows concentrate to be released from the filtration system so that a large drop in pressure does not occur. Large pressure drop could adversely change the performance characteristics of the venturi 26I.

As shown in FIG. 3 we used the CHUF 55 to construct a filtration system that functions as shown in FIG. 2. This system produced excellent results during nearly all tests. However, we observed that when low recirculation flow occurs, the low flow through the venturi 26I produces insufficient suction to pull feedstock into the filtration system.

Figure 10:
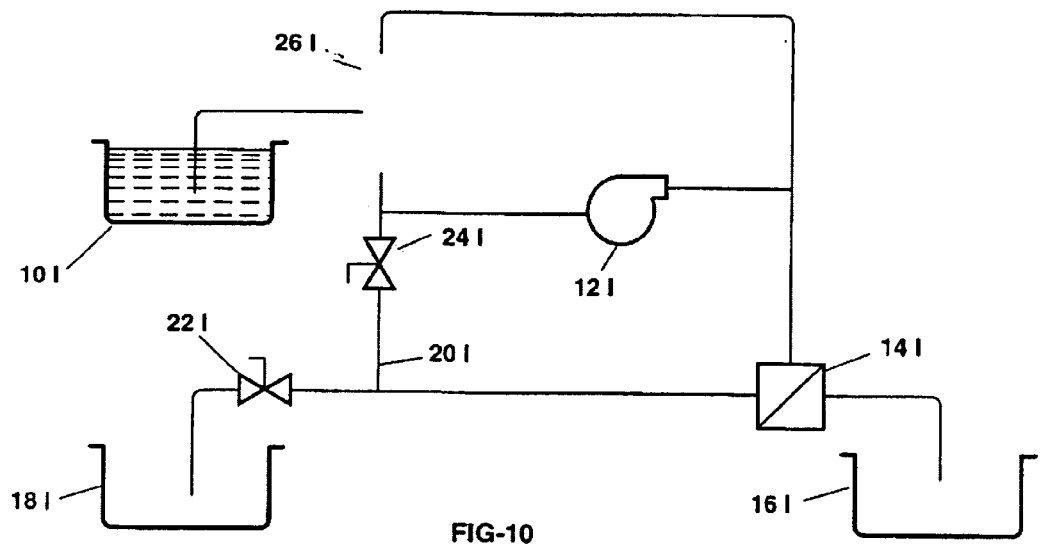
FIG. 10 is a flow diagram showing filter in series with flow control valve for retentate and in parallel with venturi.

We overcame this limitation by locating the filter 14I in parallel with the venturi 26I and in series with the flow control valve for retentate 24I as illustrated in FIG. 10. Note that a new system configuration occurs by switching the positions of the venturi 26I and flow control valve for retentate 24I. In the parallel and series configuration shown in FIG. 10 the outflow from a single pump 12I is divided into two component flows. One of these component flows passes through the venturi 26I and back to the inflow side of the pump 12I. The remaining component flow passes through the filter 14I and then the flow control valve for retentate 24I positioned downstream and in series with the filter 14I. The outflow from the flow control valve for retentate 24I, is connected to the pump 12I inflow. The flow through the venturi 26I, and therefore the sucking force created by the venturi, is controlled by a flow through the flow control valve for retentate 24I. The pressure and flow at the filter 14I is also controlled by opening or closing the flow control valve for retentate 24I. The venturi 26I continually sucks (or pulls) feedstock from the sump tank 10I into the filtration system. The concentration of the retentate is regulated by periodic blowdown of retentate by opening the flow control valve for concentrate 22I. The concentrate is removed to the concentrate collection tank 18I. The permeate that passes through the filter 14I is drained to the permeate collection tank 16I.

Figure 11:
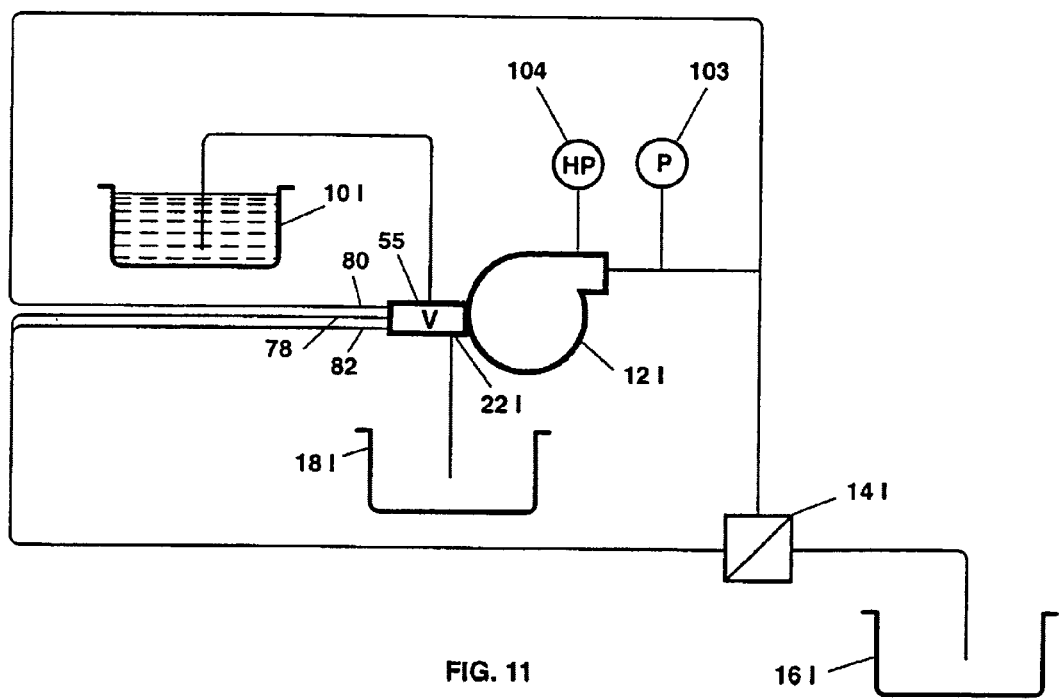
FIG. 11 is a flow diagram showing how a CHUF is used to construct the filtration system illustrated in FIG. 10.

FIG. 11 shows how the CHUF 55 would be connected to implement the series and parallel configuration shown in FIG. 10. The outflow from the pump is directly connected to the inflow of the venturi flow conduit 80. Another parallel flow from the pump 12I is connected to the filter 14I and then to the retentate release conduit 82 and the bypass flow conduit 78. Note that when the retentate is not removed from the retentate release conduit 82 then all flow from the filter 14I passes through the bypass flow conduit 78. These connections assure that fresh feedstock sucked into the filtration system through the venturi 26I is not expelled as concentrate before passing through the filter 14I at least once. Additional conduit is connected from the flow control valve for concentrate 22I within the CHUF 55 to the concentrate collection tank 18I, and from the CHUF 55 to the sump tank 10I where feedstock is located.

The same CHUF 55 is used to implement the series configuration shown in FIG. 3 and the series and parallel configuration shown in FIG. 10. Only plumbing connections to the CHUF are different in these two cases. For both cases the inflow conduit 63 is plugged.

Figure 12:
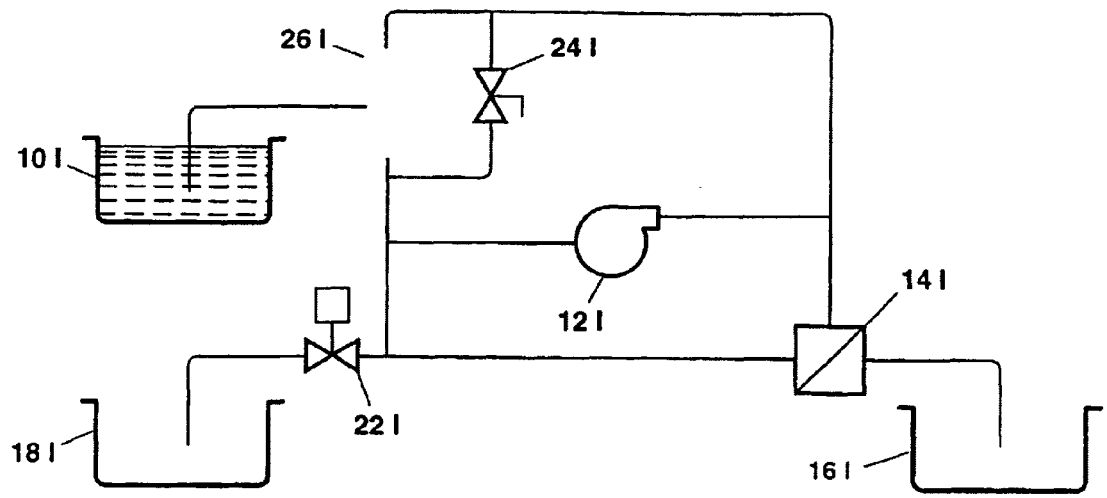
FIG. 12 is a flow diagram showing filter in parallel with flow control valve for retentate and venturi.

In FIG. 12 the outflow from a single pump 12I is divided into two component flows so that the filter 14I is in parallel with the venturi 26I and bypass containing the flow control valve for retentate 24I. The venturi 26I and by-pass containing the flow control valve for retentate 24I are in parallel. The venturi 26I continually sucks (or pulls) feedstock from the sump tank 10I into the filtration system. The pressure and flow at the venturi 26I and filter 14I are controlled by opening or closing the flow control valve for retentate 24I. The concentration of the retentate is regulated by periodic blowdown of retentate by opening the flow control valve for concentrate 22I. The concentrate is removed to the concentrate collection tank 18I. The permeate that passes through the filter 14I is drained to the permeate collection tank 16I. Note that a batch mode filtration system exists if all retentate from the filter 14I is drained to the concentrate collection tank 18I rather than returning the retentate to the pump 12I. In fact, the system shown in FIG. 12 will function even in the limiting case of a dead end filter where there is no outflow of retentate from the filter 14I.

A high pressure, low flow pump was determined to be best suited for the series configuration described in U.S. Pat. No. 5,725,758, shown here as FIG. 2. The high pressure, low flow pump was needed in many applications to accommodate the cumulative pressure drop through the filter 14I and venturi 26I or flow control valve for retentate 24I. However, we determined that a high flow pump, such as a centrifugal pump, is more appropriate for the parallel configuration described in FIG. 12. In this case flow is higher because of the parallel configuration, and pressure drop from the pump outflow to inflow only equals the pressure drop through the filter 14I.

Figure 13:
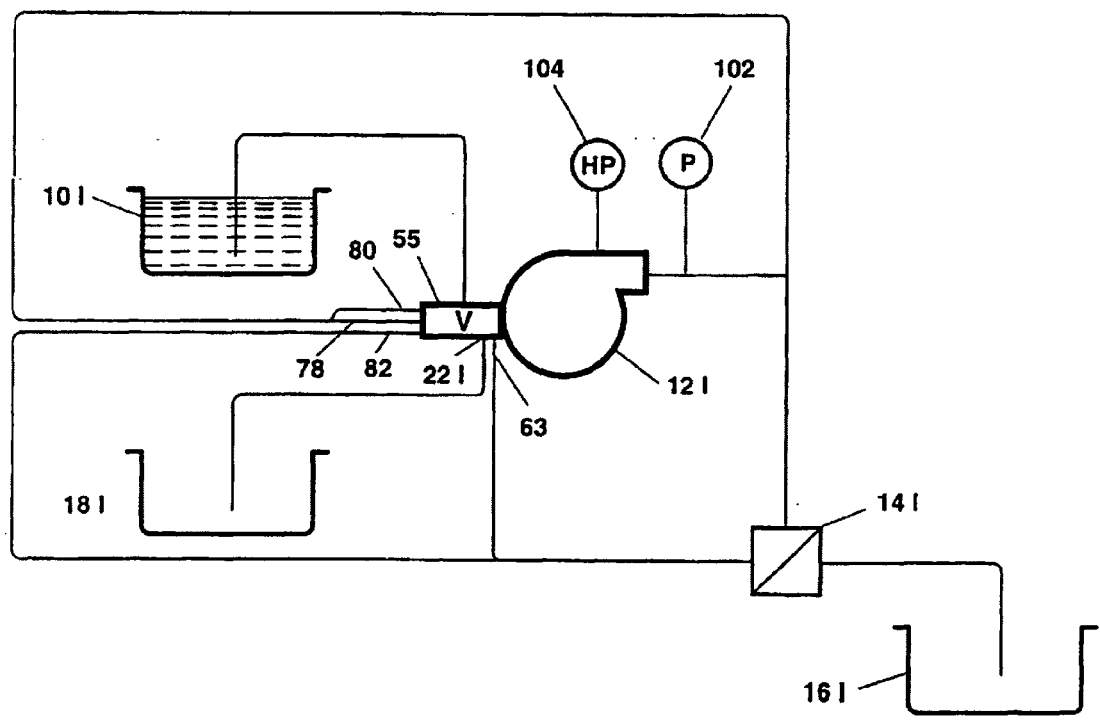
FIG. 13 is a flow diagram showing how a CHUF is used to construct the filtration system illustrated in FIG. 12.

FIG. 13 shows how a CHUF 55 is used to construct the parallel filtration system shown in FIG. 12. As shown, the outflow of a CHUF 55 is attached directly to the inflow of a pump 12I. The outflow of the pump 12I is divided into two component flows, each flow returning to the CHUF 55 at different inflow connection ports. One conduit containing flow from the pump 12I is attached directly to the inflow to the venturi flow conduit 80 and the bypass flow conduit 78. The remaining conduit from the pump 12I is attached the filter 14I inflow; and then conduit from the filter 14I outflow is divided into two streams; one attached directly to the inflow conduit 63 which is shown in FIG. 4 and 6, and the other to the retentate release conduit 82. Conduit is used to is used to suck feedstock from the sump tank 10I to the feedstock conduit 76 which is part of the CHUF 55 as shown in FIG. 4 and 6. Conduit is added to conduct permeate from the filter 14I to the permeate collection tank 16I. Two sensors are added to the pump to provide inputs to computer algorithms that control the filtration system. First, a pressure sensor shown as 102 measures the outflow pressure of the pump 12I. A second sensor measures pump horsepower 104.

The fluid dynamics of the system configuration shown in FIG. 10 and FIG. 12 are similar to the those controlling the system arrangement shown in FIG. 2, which is described also in U.S. Pat. No. 5,725,758. In all three system configurations, as the single flow control valve for retentate 24I is closed (opened), increased (decreased) flow at the venturi 26I and increased (decreased) pressure at the filter 14I occurs. The result is that the single flow control valve for retentate 24I simultaneously controls the outflow from, and inflow into, the filtration system through two components, which operate on different physical principles. Specifically, inflow through the venturi 26I is flow dependent as determined by Bernoulli's equation. Outflow though the filter 14I is pressure dependent. Since the venturi 26I is a passively controlled device, it is only necessary to actively control the flow control valve for retentate 24I and the release of concentrate from the system though the flow control valve for concentrate 22I. The more commonly used system shown in FIG. 1 requires the simultaneous control of two different pumps plus the release of concentrate from the system. The operator of our system only needs to regulate the control valve for retentate 26I to regulate flux. This is a major competitive advantage particularly for small and mid-sized system applications.

There are important differences between the system configurations. For the parallel configuration shown in FIG. 12 the pressure drop though the filter 14I equals the pressure drop through the venturi 26I, which also equals the pressure drop through the flow control valve for retentate 24I. The outflow from the pump 12I equals the flow through the filter 14I plus the flow through the venturi 26I plus flow control valve for retentate 24I. The somewhat opposite condition is true for the series configuration described in U.S. Pat. No. 5,725,758 and in FIG. 2. For the series configuration the flow through the filter 14I is identical to the flow of retentate through the combination of the venturi 26I and flow control valve for retentate 24I. However, the pressure drop within the single recirculation loop equals the pressure drop through the membrane plus the pressure drop through the venturi 26I or equivalently the pressure drop through the flow control valve for retentate 24I. A hybrid condition exists for the series and parallel case shown in FIG 10. Note that in this configuration the pressure drop through the venturi 26I equals the sum of the pressure drop through the filter 14I plus the pressure drop through the flow control valve for retentate 24I.

Figure 14:
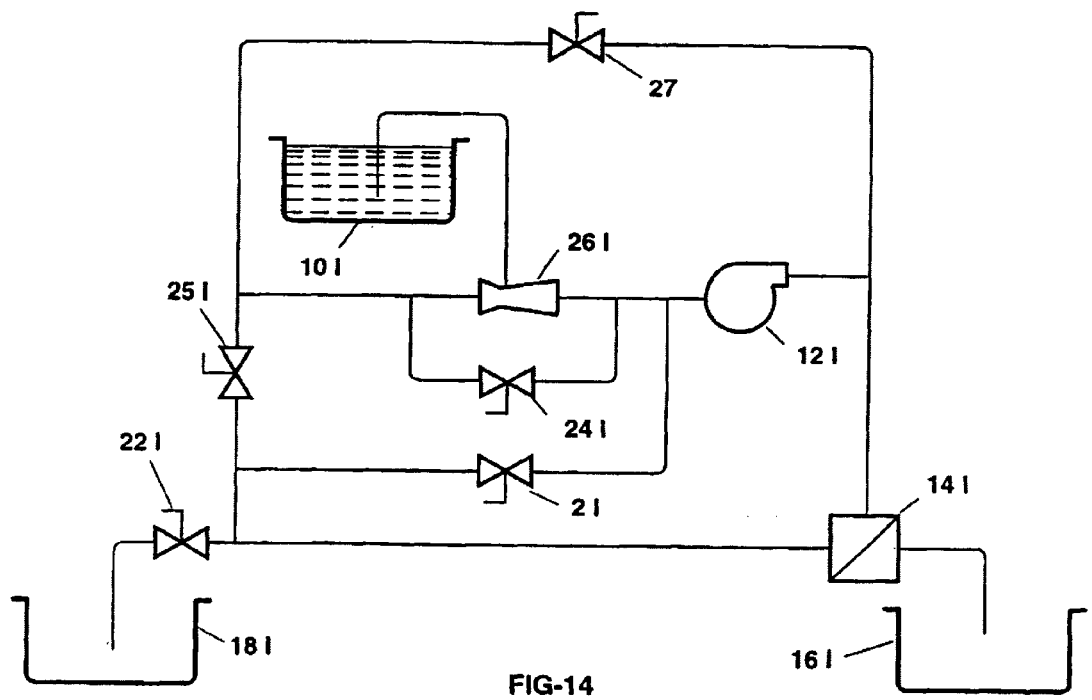
FIG. 14 is a flow diagram showing filter in parallel or series configuration.

FIG. 14 illustrates a filtration system where four flow control valves are used to switch between the parallel and series configurations defined in FIG. 2, FIG. 10 and FIG. 12. Referring to FIG. 14:

1. If flow control valves 21 and flow control valve 27 are open and flow control valve 25 is closed, then the filter 14I is in parallel with the flow control valve for retentate 24I and venturi 26I. In this case the system functions as illustrated in FIG. 10 with the flow control valve for retentate 24I controlling the pressure and flow at the filter 14I. FIG. 12 illustrates how the CHUF 55 would be used to implement this parallel operational mode.

2. If flow control valve 21 and flow control valve number 27 are closed and flow control valve 25 is open, then the filter 14I is in series with the flow control valve for retentate 24I and venturi 26I. In this case the system functions as illustrated in FIG. 2 with flow control valve for retentate 24I controlling the pressure and flow at the filter 14I. FIG. 3 illustrates how the CHUF 55 is used to implements this series operational mode.

3. If flow control valves 21 and flow control valve for retentate 24I are closed, and flow control valve 27 is open then the filter 14I is in series with flow control valve 25 and in parallel with the venturi 26I. In this case the system functions as illustrated in FIG. 12 with flow control valve 25 controlling the pressure and flow at the filter 14I. FIG. 13 illustrates how the CHUF 55 is used to implements this series and parallel operational mode.

By simultaneously partially opening or closing the flow control valve for retentate 24I and flow control valves 21,25,27, the pressure and flow at the filter become decoupled thereby controlling pressure independent of flow. This configuration is implemented by appropriately positioning these control valves 24I,21,25 and 27 in conduit leading to the CHUF 55. We believe this configuration is particularly attractive for laboratory test equipment.

All configurations have in common a single flow control valve used to simultaneously control the inflow into the filtration system through the venturi 26I and the outflow of the filtration system through the filter 14I. All system configurations have only one component which varies the steady state pressure and flow within the filtration system, namely the flow control valve for retentate 24I. As the flow through the flow control valve for retentate is decreased (increased), then increased (decreased) flow and therefore increased (decreased) pressure must occur at the venturi 26I and filter 14I. The CHUF 55 is only a convenient means to package the flow control valve for retentate 24I and the venturi 26I. The flow control valve for concentrate 22I, temperature sensor 106, flow sensor 107, pressure sensor 106, and pressure sensor 108 are convenient addition to the CHUF 55. The CHUF 55 defined in the above text will function in a filtration system even if the CHUF 55 is attached to the outflow of the pump followed by the filter which returns retentate to the pump.

In the series configuration a relatively high pressure drop occurs within the recirculation loop when compared to the parallel configuration. In the parallel configuration a higher flow output from the pump is required when compared to the series configuration. Switching between the parallel and series configuration creates a higher pressure and lower flow followed by lower pressure and higher flow to occur at the membrane surface.

We claim:

1. A valve comprising a valve body, said valve body comprising:
   (a) a feedstock conduit;
   (b) a venturi flow conduit in contact at an intersection with said feedstock conduit, and adapted to suck feedstock fluid through said feedstock conduit, the force of said sucking dependent upon flow through said venturi flow conduit;
   (c) a bypass flow conduit adapted to conduct bypass fluid through said valve; and
   (d) an adjustable first flow controller to control flow of said bypass fluid.

2. A valve according to claim 1 comprising a retentate release conduit adapted to conduct flow of concentrate fluid from said valve body.

3. A retentate release conduit according to claim 2 comprising a second flow controller for said concentrate fluid from said valve body.

4. A retentate release conduit according to claim 2 comprising means to minimize pressure drop of said retentate when said flow of retentate is removed from said valve body.

5. Means to minimize pressure drop according to claim 4 comprising spring and piston.

6. A valve according to claim 1 comprising inflow conduit downstream from said intersection.

7. A valve according to claim 1 comprising a first pressure sensor to measure pressure of said flow through said venturi flow conduit at a position upstream from said intersection.

8. A valve according to claim 1 comprising a second pressure sensor downstream from said intersection.

9. A valve according to claim 1 comprising a temperature sensor to measure temperature of said bypass fluid.

10. A valve according to claim 1 comprising a flow sensor to measure flow of said feedstock fluid.

11. A fluid filtering system adapted to separate a permeate from a feed stock fluid, said system comprising: (a) a valve according to claim 1, (b) a single pump (c) a filter.

12. A fluid filtering system adapted to separate a permeate from a feed stock fluid, said system comprising: a single pump, a filter and said valve of claim 2 wherein said feedstock conduit connects to a sump tank containing feedstock and said retentate release conduit for concentrate connects to a collection tank.

13. A fluid filtering system adapted to separate a permeate from a feed stock fluid, said system comprising: a single pump, a filter and said valve of claim 6, said fluid filtering system comprising at least one retentate conduit circuit adapted to recirculate flow of a retentate fluid through said single pump adapted with said valve wherein at least one element selected from the group including said bypass flow conduit of said valve, said venturi flow conduit of said valve and said inflow conduit of said valve, connect to at least one element selected from the group including said pump and said filter.

14. A fluid filtering system adapted to separate a permeate from a feed stock fluid, said system comprising: a single pump, a filter and said valve of claim 7 wherein said first pressure sensor is attached to a microprocessor.

15. A fluid filtering system adapted to separate a permeate from a feed stock fluid, said system comprising: a single pump, a filter and a valve according to claim 9 wherein said temperature sensor is attached to a microprocessor.

16. A fluid filtering system adapted to separate a permeate from a feed stock fluid, said system comprising: a single pump, a filter and said valve of claim 10 wherein said flow sensor is attached to a microprocessor.

17. A fluid filtering system according to claim 11 wherein said filter is selected from reverse osmosis filters, nanofiltration filters, ultrafiltration filters and microfiltration filters.

18. A fluid filtering system according to claim 11 wherein said filter is a cross flow filter.

19. A fluid filtering system according to claim 11 wherein said pump comprises a pressure sensor to measure outflow pressure of said pump.

20. A fluid filtering system according to claim 11 wherein said pump comprises a sensor to measure horsepower of said pump.

* * * * *